UNITED STATES PATENT OFFICE.

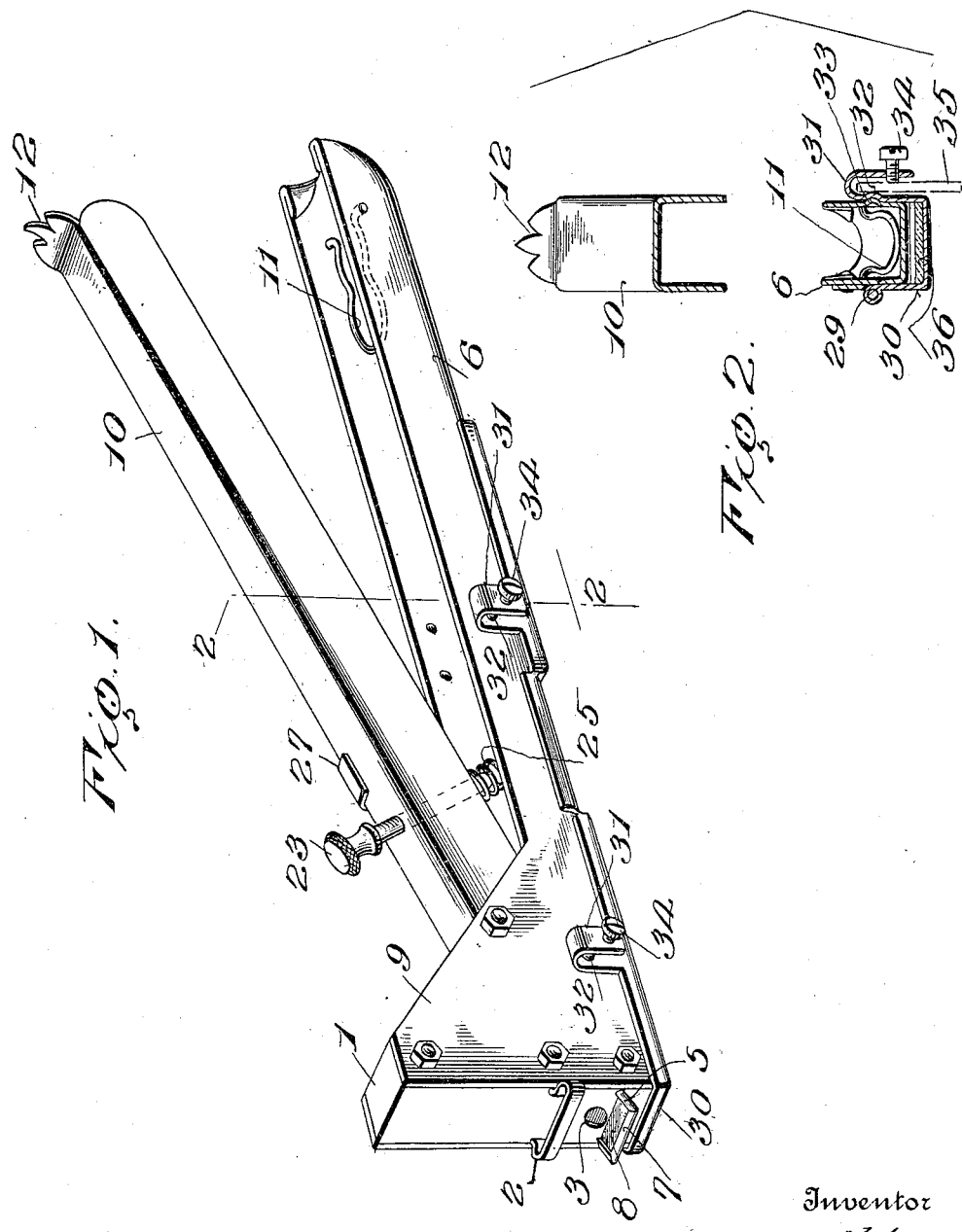

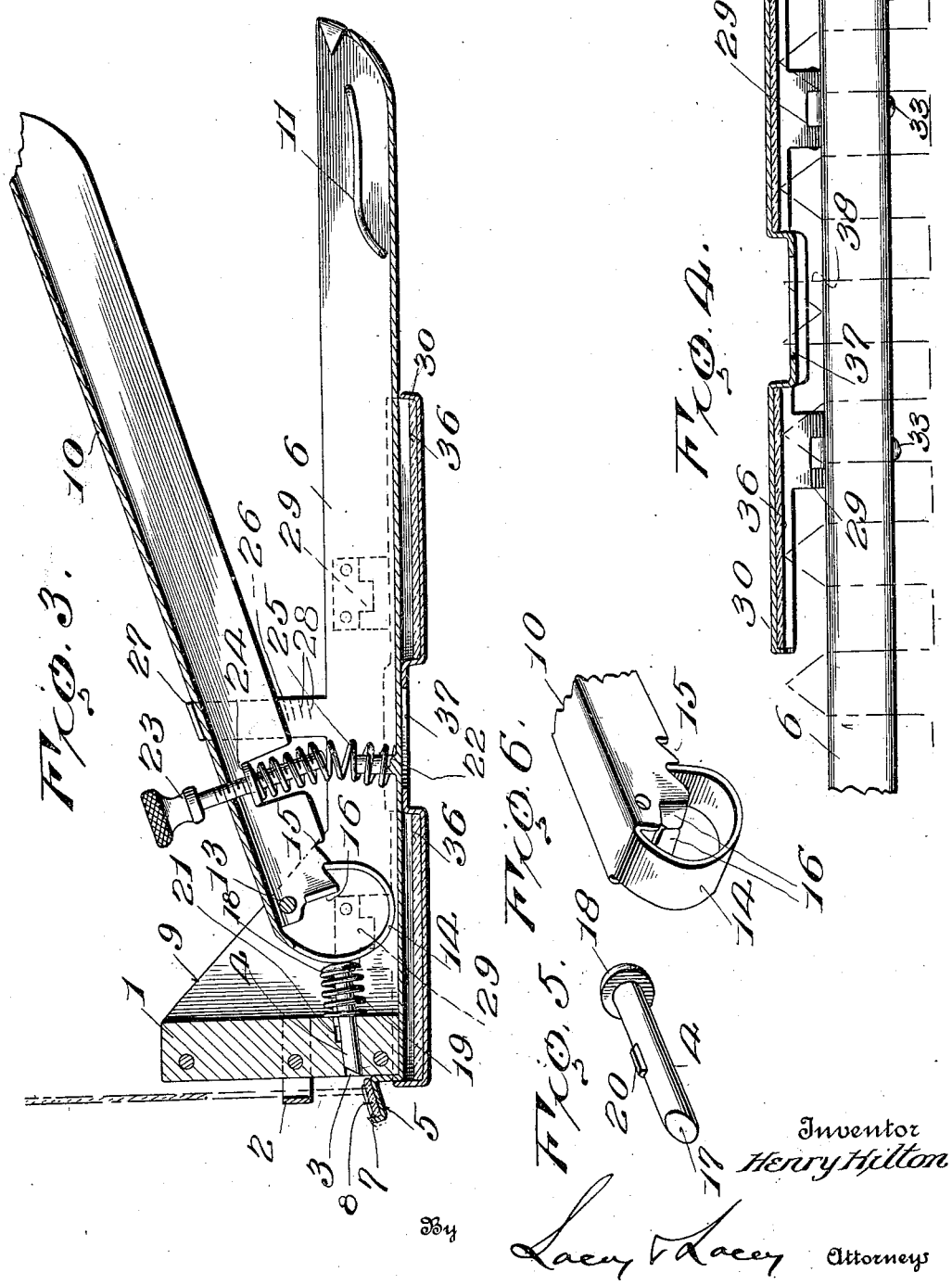

HENRY HILTON, OF VICTORIA, BRITISH COLUMBIA, CANADA.

SAW SETTING AND FILING TOOL.

1,297,565.          Specification of Letters Patent.     Patented Mar. 18, 1919.

Application filed September 7, 1918. Serial No. 253,087.

*To all whom it may concern:*

Be it known that I, HENRY HILTON, a subject of the King of Great Britain, residing at Maywood, Victoria, in the Province of British Columbia and Dominion of Canada, have invented certain new and useful Improvements in Saw Setting and Filing Tools, of which the following is a specification.

This invention is a tool intended more particularly for setting the cutting teeth of cross-cut saws and gaging the filing of the drag teeth of the same. The object of the invention is to provide a simple, inexpensive and efficient tool which may be easily operated and which, when in use, will be certain and positive in its action.

The invention is illustrated in the accompanying drawings and consists in certain novel features which will be hereinafter first fully described and then more particularly pointed out in the appended claims.

In the drawings—

Figure 1 is a perspective view of a tool constructed in accordance with my invention;

Fig. 2 is a transverse section taken on the line 2—2 of Fig. 1;

Fig. 3 is a longitudinal section;

Fig. 4 is an elevation showing the gage in longitudinal section and in position upon a saw;

Fig. 5 is a detail perspective view of the setting pin;

Fig. 6 is a detail perspective view of the operating head or cam upon the setting lever.

In carrying out my invention, I employ a body 1 which may be of any suitable durable material and is equipped with a loop or eye 2 through which the tooth to be set is inserted and by which it will be held during the setting operation. This eye may be slightly flared, if desired, to facilitate the insertion of the tooth and the eye will be positioned closely enough to the gage, presently mentioned, to retain the saw tooth in position while it is being set. The body 1 is provided near one end with a passage or opening 3 in which the setting pin 4 operates and below the said passage a stop rest or gage 5 is provided upon the body. In the illustrated construction the rest or stop 5 is formed upon the end of a handle member 6 which is preferably constructed of stout sheet metal, the rest being produced by bending up an extension or tongue of the handle member so that it will fit across the end of the body and against the side of the same and then project slightly downwardly and forwardly therefrom, as clearly shown. An overhanging flange 7 is provided around the edges of the rest so as to retain a plate 8 of glass or other hard wear-resisting material to receive the point of the saw tooth and provide a firm support for the same. The handle member 6 is substantially U-shaped in cross section and its side portions are provided at the end adjacent the rest 5 with wings or extensions 9 which are secured to the sides of the body so that the handle will be firmly supported and will provide a housing for the setting lever 10. The setting lever 10 is of the same material and is similar in form to the handle member but slightly narrower than the handle so that when the tool is not in use the lever may be housed within the handle member and the tool, consequently, stored in a small space. To retain the lever in its closed position and housed within the handle member, a bail or retaining loop or clasp 11 is pivotally mounted in the end of the handle and adapted to engage over a lip 12 on the end of the lever as will be readily understood.

The setting lever is fulcrumed upon a pin 13 between the wings 9 and at its inner end is provided with a cam or setting head 14 which is adapted to bear upon the setting pin 4 and drive the same against the saw tooth when the lever is swung toward the handle. The setting head or cam may be conveniently formed by providing an extension or tongue at the end of the cross wall of the lever and then bending the said tongue into the desired shape and engaging the extremity of the same in one of a plurality of notches 15 in the edges of the side walls of the lever, as clearly shown. After the setting cam or head is properly shaped it is tempered so as to hold the shape and resist wear. Bracing lugs or lips 16 may be provided at the ends of the side walls of the lever to abut at their inner ends and thereby prevent collapse of the said side walls. The setting pin has its outer end beveled, as shown at 17, so as to impart the desired inclination to the saw tooth and at its inner end it is provided with a head 18 which has sliding contact with the setting head 14 of the lever, the surface of the said head 18 being preferably convex so as to minimize frictional wear and facilitate the easy operation of the pin. A spring 19 is coiled around the pin between the head of the same and the inner surface of the body 1 and holds the pin normally retracted and constantly in contact with the setting head or cam while the pin is prevented from rotating by a feather 20 slidably engaging a groove 21 in the body, the said feather being disposed preferably midway the length of the pin and of such length that a part of it will be always in engagement with the groove 21 and the outward movement of the pin will be limited by the front end of the feather impinging against the front end wall of the groove 21 as will be understood.

Upon the inner surface of the cross member of the handle, I provide a boss or other convenient form of stop 22 and in the lever is mounted an adjusting screw 23 which is adapted to coöperate with the said stop. The screw is threaded into the lever and is equipped with a stop 24 between which and the handle is interposed a coiled spring 25 which has its ends arranged, respectively, around the screw and the stop 22. A gage 26 extends laterally from the handle and may be conveniently in the form of an arm integral with the handle, as shown, the extremity of the said arm being turned at an angle to provide a lip 27 which projects over the lever and serves to limit the outward movement of the lever. A plurality of graduations 28 is provided upon the outer face of the gage 26 and coöperates with the inner edge of the adjacent side of the lever to determine the set of the saw teeth. To adjust the tool to impart any desired inclination or set to the saw tooth, the lever is swung about its fulcrum until the inner edge of the side of the lever coincides with that graduation upon the gage which indicates the desired angle to be given the tooth. While the lever is held in this position the screw 23 is turned inwardly until its inner extremity abuts the end of the stop 22 so that subsequent inner movement of the lever will be arrested at the point indicated by the graduation.

To one side of the handle I secure, by hinges 29, a raker gage 30 which consists of a shallow trough having its side flanges slightly flared so that when the gage is not in use it will fit easily over the back of the handle, as shown in Figs. 1 and 2, and at the free edge of the gage I provide clips 31 having recesses, sockets or openings 32 formed in their inner walls adapted to engage teats or projections 33 on the adjacent side of the handle and thereby retain the gage in its inoperative position. In the outer walls or members of the clips I mount set screws 34 by which a file, indicated in dotted lines at 35 in Fig. 2, may be secured in the clips. The gage 30 has its end portions constructed to provide seats for plates 36 of glass, porcelain, or other hard wear-resisting material and its central portion is offset inwardly from the said seats and provided with a longitudinal slot 37 through which the extremities of the drag tooth of the saw may project in the use of the gage. The material of the gage around the slot 37 should be tempered so as to resist wear and the action of the file when the same is in use.

The manner of using the tool, it is thought will be readily understood. In order to bring the teeth of the saw to a uniform length, a file is secured in the clips 31 by inserting the back of the file within the clips and then turning the set screws 34 home against the face of the file, as indicated in Fig. 2, the lever 10 being held in its closed position by the engagement of the bail or loop 11 over the lip 12. The back of the tool is placed against the saw with the file resting on the edges or points of the teeth. The tool is then passed lightly over the teeth and the points thereof will be quickly reduced to the desired extent. The file may be passed the full length of the saw at one movement or may be operated within a comparatively short length of the saw and then shifted along the same for a repetition of the operation according as the operator may desire. The teeth may then be sharpened in the usual manner, after which the bail or loop 11 is released from the lever 10 and the separate teeth of the saw successively inserted through the retainer 2 against the rest 5 and set by swinging the lever to the handle and thereby causing the cam or setting head to force the setting pin outwardly against the tooth. The outward movement of the setting pin will continue until the end of the screw 23 impinges against the stop 22 so that the tooth will be given the exact set desired and when the pressure upon the lever is released the spring 25 will immediately return the lever to its initial position and the spring 19 retract the setting pin. After the saw teeth have been set the drag teeth, one of which is indicated at 38, may be too long. To shorten the same, the drag or raker gage 30 is swung about its hinged connection with the handle 6 to the position shown in Fig. 4 and is then placed over the points of the teeth with the drag tooth projecting through the slot 37. An ordinary file may then be manipulated across the point of the nail so that the portions of the same projecting above the surface of the depressed portion of the gage will be cut away.

My improved tool will permit a sawyer to quickly bring his saw into proper cutting condition without the use of hammers and dies and with no implements other than the tool except an ordinary file. The setting pin will work positively and easily against the tooth and will bend the same gently so that breaking of the tooth is not apt to occur and, as the setting action of the pin is positively arrested at the desired point by the action of the adjusting screw and the coöperating stop, the teeth of the saw will be given the same set so that they will act uniformly upon the lumber and produce a straight even kerf. The raker or drag-tooth gage being hinged to the handle member of the tool as shown and described, it will not be in the way when the teeth are being set and may be quickly brought into the proper position when it is desired to reduce the drag teeth. The tool is intended more particularly for use upon cross cut saws but by varying the dimensions of the parts it may be adapted for use upon other forms of saws as will be readily understood.

Having thus described my invention, what is claimed as new is:

1. A tool for the purpose set forth comprising a body having an opening therethrough and provided upon its outer face with a rest immediately below the said opening, a saw tooth retainer upon the body above the opening, a setting pin slidably mounted in the opening, a handle member projecting from the body, and a setting lever fulcrumed upon the handle and provided with a setting head bearing upon the setting pin.

2. A tool for the purpose set forth comprising a body, a handle member extending from the body and provided adjacent the same with lateral wings, a setting pin slidably mounted in the body, means for holding the pin normally retracted, a setting lever fulcrumed between the wings of the handle and provided at its fulcrumed end on its inner edges with a plurality of notches, and a tongue extending from the outer side of the lever at the fulcrumed end of the same and bent eccentrically to bear upon the head of the setting pin and having its extremity engaged in one of the notches of the setting lever.

3. A tool for the purpose set forth comprising a body, a setting pin slidably mounted in the body, means for holding the pin normally retracted, a handle member extending from the body, a setting lever fulcrumed upon the handle member and provided at its inner end with a setting head bearing against the inner end of the setting pin, a gage projecting laterally from the handle member and provided with a plurality of graduations, and means upon the handle member and the lever for arresting the inward movement of the lever at any one of said graduations.

4. A tool for the purpose set forth comprising a body, a setting pin mounted in the body, a handle member extending from the body, a setting lever fulcrumed upon the handle member and provided at its inner end with a setting head operatively engaging the setting pin, a gage projecting from the handle member to coöperate with the setting lever, a stop upon the handle member, an adjusting screw mounted in the lever to coöperate with said stop, and a coiled spring having its ends carried by the said stop and the said screw.

5. A tool for the purpose set forth comprising a body, a setting pin slidably mounted in the body, a handle member extending from the body, a setting lever fulcrumed upon the handle and provided at its inner end with a setting head operatively engaging the setting pin, a lateral arm on the handle member provided at its free end with a lip projecting over the lever, a stop upon the handle member, an adjusting screw mounted in the lever to coöperate with said stop, and a coiled spring having its ends fitted upon the stop and upon the said screw.

6. A tool for the purpose set forth comprising a body, a setting pin mounted in the body, a handle member projecting from the body, a setting lever mounted upon the handle member and having a setting head operatively engaging the setting pin, a gage hinged to one side of the handle member and constructed to fit upon the back of the same, said gage being provided at its end portions with wear-resisting plates and having its central portion between said plates inwardly off-set and provided with a longitudinal slot, and clips carried by the free edge of said gage.

In testimony whereof I affix my signature.

HENRY HILTON. [L. S.]

Copies of this patent may be obtained for five cents each, by addressing the "Commissioner of Patents, Washington, D. C."